May 19, 1931.  L. C. BOYD  1,806,234
SHEARS SHARPENING DEVICE
Filed Dec. 12, 1927  2 Sheets-Sheet 1
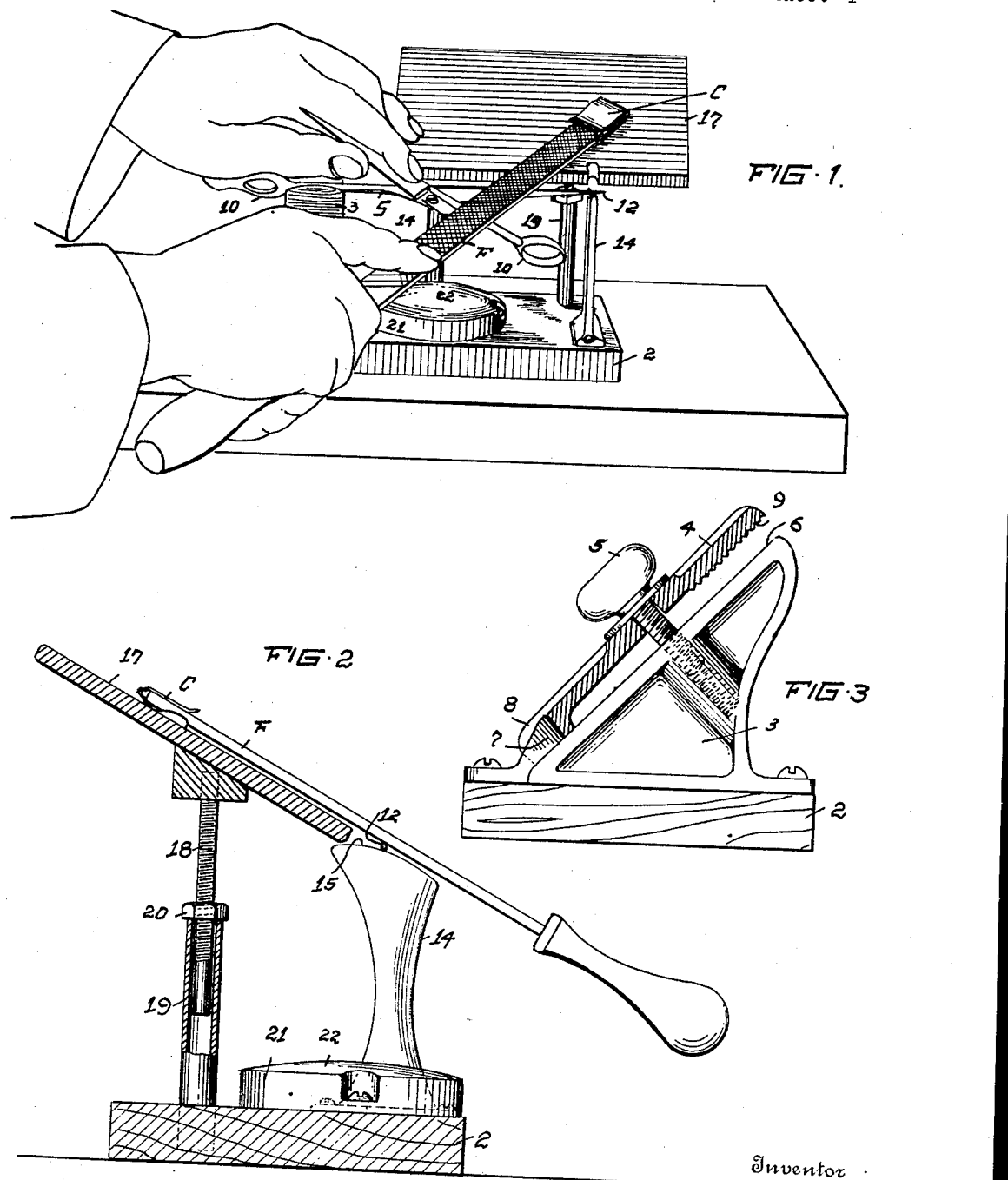
Inventor
LOREN C. BOYD
By
Fisher, Moser & Moore Attorney May 19, 1931.  L. C. BOYD  1,806,234
SHEARS SHARPENING DEVICE
Filed Dec. 12, 1927   2 Sheets-Sheet 2
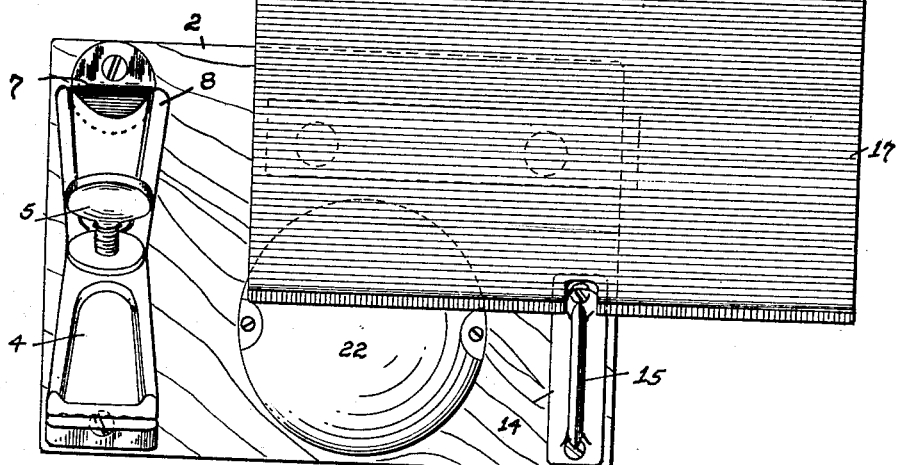
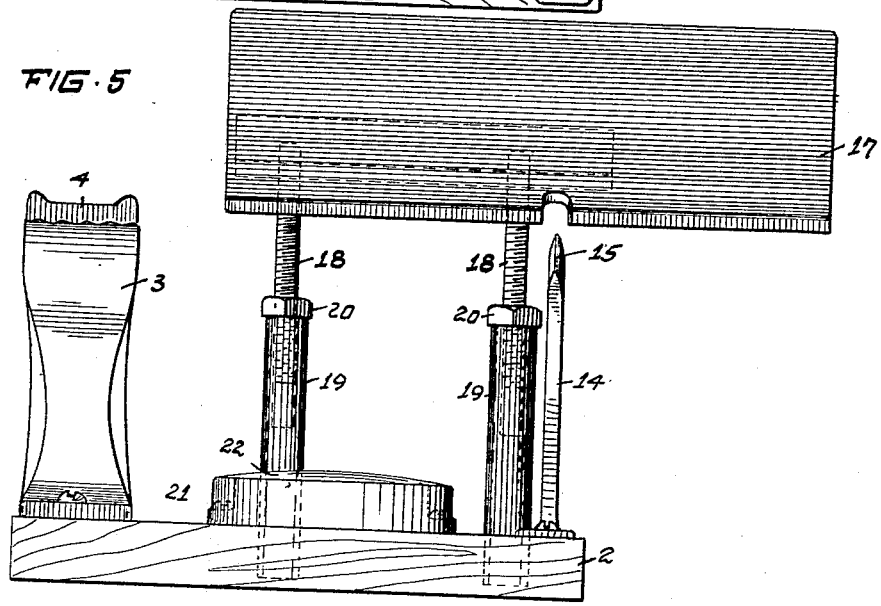
Inventor
LOREN C. BOYD
By Fisher, Moser & Moore, Attorney Patented May 19, 1931

1,806,234

UNITED STATES PATENT OFFICE

LOREN C. BOYD, OF WARREN, OHIO

SHEARS SHARPENING DEVICE

Application filed December 12, 1927. Serial No. 239,607.

My invention relates to shears sharpening devices, and in general my object is to provide a device for clamping and holding a shear blade opposite an inclined rest and guide for a file to permit the beveled cutting edge of the blade to be sharpened with accuracy and dispatch. As constructed the device permits the handle of the shear blade to be clamped rigidly in an inclined position and the point end of the blade to be seated upon a curved steady rest so that the beveled cutting edge of the blade lies in substantially the same inclined plane as a flat guiding member for the file, and which member is adjustable vertically and arranged to tilt slightly to permit parallel alignment with the longitudinal edge of the blade. The device also embodies an anvil wherewith a straightening or bending operation may be conveniently performed on the shear blade.

In the accompanying drawings, Fig. 1 is a perspective view of the sharpening device, showing a shear blade being operated upon by a file. Fig. 2 is a sectional view of the device showing the file in sharpening engagement with the beveled cutting edge of a shear blade. Fig. 3 is an end elevation and sectional view of the clamp. Fig. 4 is a top view of the completed device, and Fig. 5 a front elevation thereof.

The invention comprises a base member 2 upon one end of which is mounted a clamp composed of a rigid bracket 3, a clamping bar 4, and a clamping screw 5. Bracket 3 has a flat inclined wall or face 6 with a rounded projection 7 at its lower end, and clamping bar 4 is notched or bifurcated at its lower end 8 to fit projection 7 loosely. The upper end of bar 4 has a serrated clamping face or jaw 9 to effect a secure grip on the handle 10 of a pair of shears S. When a clamping movement of bar 4 is effected by screw 5 the loose fit and joint at projection 7 permits the bar to adapt itself freely to the shape and form of the shear handle so that the blade will be held rigidly and not turn or be displaced in filing operations. The tip or pointed end 12 of the shear blade is supported on a rest member 14 which is fixed in an upright position on base 2, and the bearing or supporting edge 15 of this rest member is curved in a plane which slopes upwardly in a direction the reverse of the inclined gripping faces on the clamping bracket and bar. The shear blade is therefore held firmly in any adjusted position so that filing of the beveled edge of the blade may proceed without displacement of the blade as adjusted relatively to an inclined steady rest and guide member 17 for the tip of a file F. Member 17 is in the form of a flat plate which is supported at an inclination opposite the curved sloping edge 15 of the rest member 14 for the blade. The guide and rest member 17 is mounted upon two screw-threaded stems 18 which extend loosely into hollow posts 19, and nuts 20 support the stem upon the tops of the posts. Nuts 20 also permit the guide and rest member 17 to be adjusted vertically, and the loose fit permits the stems to be tilted slightly within the posts and to support member 17 parallel with the longitudinal edge of the blade regardless of the type of shears to be sharpened. In operations the file passes transversely of the cutting edge of the blade, and the guide member 17 for the file is adjusted so that the flat top surface of said member is inclined in a parallel plane with that of the beveled edge of the blade, being in a slightly lower plane however when a clip C is used to cover the tip of the file so that the file may slide freely over the flat surface of guide member 17. The covered file tip, in the first filing operations, moves diagonally over the flat surface of member 17 as the file travels across and lengthwise of the cutting edge of the blades. A second filing operation then proceeds with a different kind of file, one in which the movement is only transversely of the cutting edge the width of the file to produce very fine serrations in the cutting edge. By finishing the edge with minute teeth an extremely effective cutting edge is produced. An anvil 21 having a convexly curved top 22 is secured to base 2 intermediate clamping bracket 3 and rest member 14. This anvil is used when a shear blade requires either straightening or bending to co-act with better cutting effect with the second blade.

What I claim is:

A shears sharpening device, comprising a base, a clamping holder having an inclined clamping surface, an upright member having a rest surface for the end of the shear blade and a guide table mounted for vertical adjustment rearwardly of said clamping holder and said upright member, the surface of said guide table and the rest surface of said upright member being inclined in opposite directions with respect to said clamping surface of said clamping holder.

In testimony whereof I affix my signature.

LOREN C. BOYD.